United States Patent [19]

Iwao et al.

[11] Patent Number: 5,469,289
[45] Date of Patent: Nov. 21, 1995

[54] LIGHT SCANNING DEVICE

[75] Inventors: Naoto Iwao, Nagoya; Shoji Yamada, Konan, both of Japan

[73] Assignee: Brother Kogyo Kabushiki Kaisha, Aichi, Japan

[21] Appl. No.: 253,562

[22] Filed: Jun. 3, 1994

[30] Foreign Application Priority Data

Jun. 4, 1993 [JP] Japan ................................. 5-134327

[51] Int. Cl.$^6$ ................................................. G02B 26/08
[52] U.S. Cl. ........................... 359/200; 359/196; 359/198; 359/199
[58] Field of Search ........................ 359/196, 198, 359/199, 200, 216, 217, 218; 310/90.5, 46

[56] References Cited

U.S. PATENT DOCUMENTS

| | | | |
|---|---|---|---|
| Re. 33,721 | 10/1991 | Sato et al. ................................. | 359/198 |
| 4,473,259 | 9/1994 | Goldowsky ................................. | 308/10 |
| 5,036,235 | 7/1991 | Kleckner ................................. | 310/90.5 |
| 5,355,042 | 10/1994 | Lewis et al. ................................. | 310/90.5 |

OTHER PUBLICATIONS

"Review of the Gas Centrifuge until 1962. Part 2: Principles of High–Speed Rotation" by S. Whitley, *Reviews of Modern Physics*, vol. 56, No. 1, Jan. 1984, pp. 67–97.

*Primary Examiner*—Paul M. Dzierzynski
*Assistant Examiner*—Steve Kong
*Attorney, Agent, or Firm*—Oliff & Berridge

[57] ABSTRACT

The rotational shaft 22 is provided with a pair of permanent magnets 31a and 31b, at its opposite ends. The bearing device 30 for the light scanning apparatus includes: a pair of electromagnets 32a and 32b; and a pair of voltage control circuits 33a and 33b. The electromagnet 32a is constructed from an iron core 321a provided with a coil 322a. Similarly, the electromagnet 32b is constructed from an iron core 321b provided with a coil 322b. When the rotational number increases to exceed a predetermined rotational number, the control signal generating circuit 53 switches the electric voltage applied through each of the coils 322a and 322b so as to switch the bearing stiffness of the bearing device. As a result, the resonant frequencies of the conical and cylindrical modes become much lower than the present actual rotational number $\omega 0$ of the rotational shaft. Accordingly, it is possible to prevent the rotational shaft from exhibiting any of the conical and cylindrical mode resonant actions.

22 Claims, 10 Drawing Sheets

FORWARD WHIRLS

FORWARD WHIRLS

MAXIMUM

OSCILLATION AMPLITUDE A $\Omega$
NATURAL RESONANT FREQUENCY

ROTATIONAL SPEED $\omega$

LIGHT SCANNING DEVICE

BACKGROUND OF THE INVENTION

1. Field of the Invention

The present invention relates to a light scanning device for scanning optical beam such as laser beam on a photosensitive medium in an image recording apparatus of an electrophotographic image recording type. More particularly, the present invention relates to a bearing device for supporting a rotating shaft of the light scanning device.

2. Description of the Related Art

There has been conventionally proposed an image recording apparatus of an electrophotographic image recording type such as a laser printer for recording an image on an output medium, with high speed, in accordance with image signals supplied thereto from an external computer device. The image recording apparatus generally includes: a charging device for electrically charging a photosensitive medium; a light scanning device for scanning image-bearing light beam on the photosensitive medium to thereby form a latent image thereon; a developing device for developing the latent image into a visible image; and a transferring and fixing device for transferring the developed image onto an output medium such as a paper and fixing the image thereto.

The light scanning device includes: a reflective mirror fixedly mounted on a rotational shaft; a bearing device constructed from a pair of bearings for rotatively supporting the opposite ends of the rotational shaft; and a motor for rotationally driving the rotational shaft about its rotational axis. The motor rotates the reflective mirror at several to ten thousands [rpm] to cause the reflective mirror to scan light beam incident thereon.

In the above-described conventional light scanning device, failing to mount the reflective mirror on the bearing device at a highly dynamically-balanced position causes the rotational shaft to vibrate or oscillate. Failing to precisely positioning the central axes of the reflective mirror, the rotational shaft and the bearing device also induces the vibration. The thus vibrating reflective mirror fails to scan image light beam at desired positions on the photosensitive medium.

It is generally known that a rotational body rotating or spinning about its rotational axis may excite two modes of natural resonances, i.e., cylindrical and conical modes of natural resonances where the rotational axis of the rotational body whirls or vibrates as shown in FIGS. 1A and 1B. In the cylindrical mode of whirl, the rotational axis remains parallel to its original or equilibrium position. In the conical mode of whirl, the rotational axis tilts about the center of gravity of the rotational body. The natural frequencies of resonances $\Omega y$ and $\Omega o$ for the cylindrical and conical whirls are expressed by the following equations (1) and (2), respectively:

$$\Omega_y = \pm \left( \frac{2S}{M} \right)^{1/2} \quad (1)$$

$$\Omega_o = \frac{\frac{P}{I}\omega \pm \left[ \left( \frac{P}{I}\omega \right)^2 + 4\frac{2SL^2}{I} \right]^{1/2}}{2} \quad (2)$$

where S is a bearing stiffness of a bearing device which rotatively supports the rotational body, M is the mass of the rotational body, P is the polar inertia of the rotational body obtained about the rotational axis, I is the transverse inertia of the rotational body obtained about an axis that extends orthogonal to the rotational axis and passes through the center of gravity of the rotational body, L is the length of the rotational body along the rotational axis, and $\Omega$ is the rotational number (rotational speed) of the rotational body. The positive sign (+) denotes the forward whirl where the rotational body whirls in a direction the same as the rotational direction, and the negative sign (−) denotes the backward whirl where the rotational body whirls in the direction opposite to the rotational direction.

The bearing stiffness S of the bearing device is generally defined by a ratio between the displacement amount X of the rotational axis of the rotational body from its equilibrium position and a bearing restoring force Fx which the bearing device exhibits for restoring the equilibrium position. The bearing stiffness S is therefore expressed by the following equation (3):

$$S = Fx/X \quad (3)$$

It is apparent from the above equations (1) and (2) that the resonant frequency for each of the cylindrical and conical modes of whirls is determined dependently on both the mass M of the rotational body and the bearing stiffness S of the bearing device. As the mass M decreases and as the bearing stiffness S increases, the resonant frequency for each mode of whirl increases. The resonant frequency for the conical mode of whirl also increases as the rotational speed of the rotational body increases.

It is further generally known that when the rotational body starts rotating from its rest, as the rotational number (rotational speed) $\omega$ increases to approach the natural resonant frequency $\Omega$ of each mode of whirls, the amplitude A at which the rotational body whirls or oscillates rapidly increases, as shown in FIG. 1C. When the rotational number $\omega$ equals the natural resonant frequency $\Omega$, the amplitude A of the whirls becomes extremely large. In other words, the amplitude A of the whirls becomes maximum or extremum. When the rotational number $\omega$ further increases from the natural resonant frequency $\Omega$ to recede therefrom, the amplitude A of whirls rapidly decreases. It is therefore apparent that when the rotational number is not equal to the natural resonant frequency but is close thereto, the rotational body oscillates at a large amplitude. In other words, when the rotational body rotates at a rotational number close to the natural resonant frequency, the rotational body is influenced by the corresponding natural resonance to be largely oscillated.

In the conventional light scanning device, the central axes of the reflection mirror, the rotational shaft and the bearing device are highly precisely positioned with respect to one another. A pair of highly rigid bearings of high bearing stiffness are used as the bearing device to forcibly restrain the oscillation or displacement of the rotational shaft. More specifically, because the rotational speed of the rotational shaft is not so high in the conventional light scanning device, the high bearing stiffness determines the resonant frequency for each mode of whirl to be considerably higher than the rotational number of the reflective mirror. It therefore becomes possible to forcibly restrain the rotational shaft from being influenced by any modes of natural resonant whirls.

Recently, however, the image recording apparatus is demanded to output images with much higher speed. This demand requires the light scanning device to rotate the reflective mirror with much higher rotational speed. In the above-described light scanning device employed with the bearing device of a high bearing stiffness, however, thus increased rotational speed approaches the natural resonant frequencies of the two modes of whirls. Accordingly, the rotational shaft is influenced by the natural resonances of the two modes to perform a precession action of a large amplitude. It therefore becomes difficult or impossible to stably rotate the reflective mirror with such a high speed.

One method has been proposed for stably rotating a rotor in a centrifuge in document entitled "Review of the Gas Centrifuge until 1962. Part 2: Principles of High-Speed Rotation" by S. Whitley (Reviews of Modern Physics, Vol. 56, No.1, January 1984.)

This method utilizes a bearing device of a very small value of bearing stiffness S, which in turn determines the resonant frequencies of both the cylindrical and conical modes of whirls to be considerably below the actual rotational speed of the rotational body. With this method, therefore, the rotational body can stably rotate with a rotational speed in a desired high speed range without being influenced by any resonant actions. This method is very effective to rotate or spin the rotational body with a high rotational speed, e.g., higher than several thousands rpm.

However, this method has the following problem. As described above, the low bearing stiffness determines the resonant frequencies of the both modes of whirls to low values. When the rotational body starts rotating or runs up from rest to full speed, the rotational speed has to traverse these resonant frequencies. At the time when the rotational number traverses the resonances, the rotational body excites the corresponding resonant actions to vibrate or whirl with a very large amplitude. The rotational body is largely displaced from its original position, which dangerously destroys the bearing device or wrecks the rotational body.

SUMMARY OF THE INVENTION

It is therefore, an object of the present invention to overcome the above-described drawbacks, and to provide a light scanning device which can stably rotate a reflective mirror with high rotational speed without exciting any vibration, which has a small size and which can be produced with low cost.

In order to attain the object, the present invention provides a light scanning device for scanning light, comprising: a reflective mirror having a mirror surface for receiving and reflecting light, the reflective mirror having a rotational shaft which extends along its central axis; a bearing device for rotatively supporting the rotational shaft about its central axis with a bearing stiffness; a driving member for rotating the rotational shaft about the central axis so as to rotate the reflective mirror about the central axis to thereby cause the reflective mirror to scan the reflected light; and a control unit for controlling the bearing stiffness of the bearing device.

The light scanning device may preferably further comprise: a detecting unit for detecting a rotational speed of the rotational shaft, wherein the control unit is connected to the detecting unit for adjusting the bearing stiffness of the bearing device in response to the detected rotational speed.

The driving member may preferably start rotating the rotational shaft to gradually increase the rotational speed of the rotational shaft, wherein the bearing device of a first predetermined bearing stiffness causes the reflective mirror to resonate with a first predetermined resonant frequency, and the bearing device of a second predetermined bearing stiffness different from the first predetermined bearing stiffness causes the reflective mirror to resonate with a second predetermined resonant frequency much lower than the first predetermined resonant frequency, and wherein the control unit switches the bearing stiffness from the first predetermined bearing stiffness to the second predetermined bearing stiffness when the rotational speed reaches a predetermined value which is higher than the second predetermined resonant frequency and lower than the first predetermined resonant frequency.

The control unit may preferably switch the bearing stiffness from the first predetermined bearing stiffness to the second predetermined bearing stiffness when the rotational speed reaches a predetermined value which is higher than the second predetermined resonant frequency and much lower than the first predetermined resonant frequency.

The control unit may preferably switch the bearing stiffness from the first predetermined bearing stiffness to the second predetermined bearing stiffness when the rotational speed exceeds the second predetermined resonant frequency.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE INVENTION

Figure 1A:
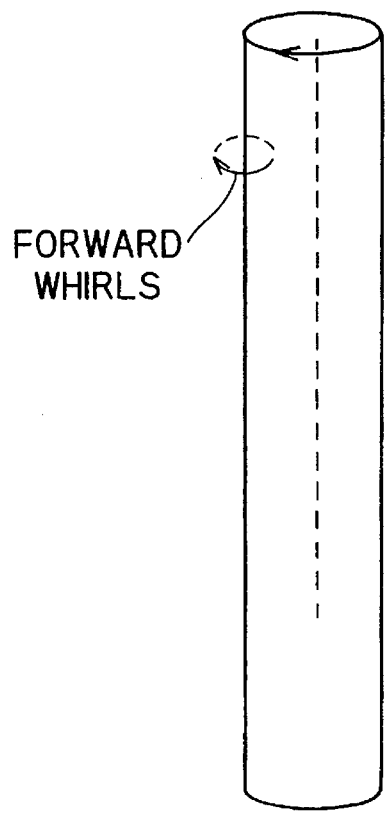
FIG. 1A illustrates that a rotational body resonates in a cylindrical mode.
Figure 1B:
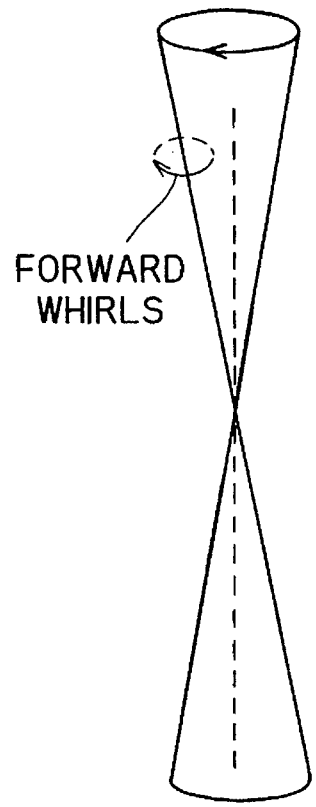
FIG. 1B illustrates that a rotational body resonates in a conical mode.

In a light scanning apparatus of the present invention, a reflective mirror is concentrically mounted on a rotational shaft for reflecting a light beam modulated in accordance with an image information. The rotational shaft is rotatively supported by a bearing device and driven to be rotate by a driving member. In the present invention, the bearing stiffness of the bearing device is adjustable.

In the light scanning apparatus with the above-described structure, when the rotational shaft starts rotating or runs up from its rest, the bearing stiffness of the bearing device is first set to a high value (first value), which causes resonant frequencies of both of the cylindrical and conical modes of natural whirls to become much higher than the actual rotational speed (rotational number) of the rotational shaft. It therefore becomes possible to prevent the rotational shaft from exciting any modes of natural whirls. The vibration of the rotational shaft can therefore be easily restrained.

When the rotational number (rotational speed) increases to exceed a predetermined value, the bearing stiffness is switched from the first value into another value (second value) which is much lower than the initial value. As a result, the resonant frequencies for the two modes of natural whirls become considerably below the presently attained actual rotational number (rotational speed) of the rotational shaft. It therefore becomes possible to prevent the rotational shaft from exciting any resonant whirls. Thus, the rotational shaft can be stably rotated.

It is noted that the predetermined value of the rotational speed (rotational number) for determining the timing at which the bearing stiffness is switched from the first value to the second value is preferably selected to be equal to a higher one of the resonant frequencies for the two modes of natural whirls determined for the second value of the bearing stiffness.

Thus varying the stiffness of the bearing device prevents the rotational speed of the rotational shaft from approaching or traversing any of the resonant frequencies for the two modes of natural whirls at any time, that is, during when the rotational speed is being increased toward the desired rotational speed and during when the rotational speed is fixed at the desired rotational speed. Accordingly, it is possible to prevent the rotational shaft from being affected by any of the two modes of resonant whirls while the reflective mirror is rotating.

Referring to the accompanying drawings, a preferred embodiment of the invention will be described below wherein like parts and components are designated by the same reference numerals to avoid duplicating description.

Figure 2:
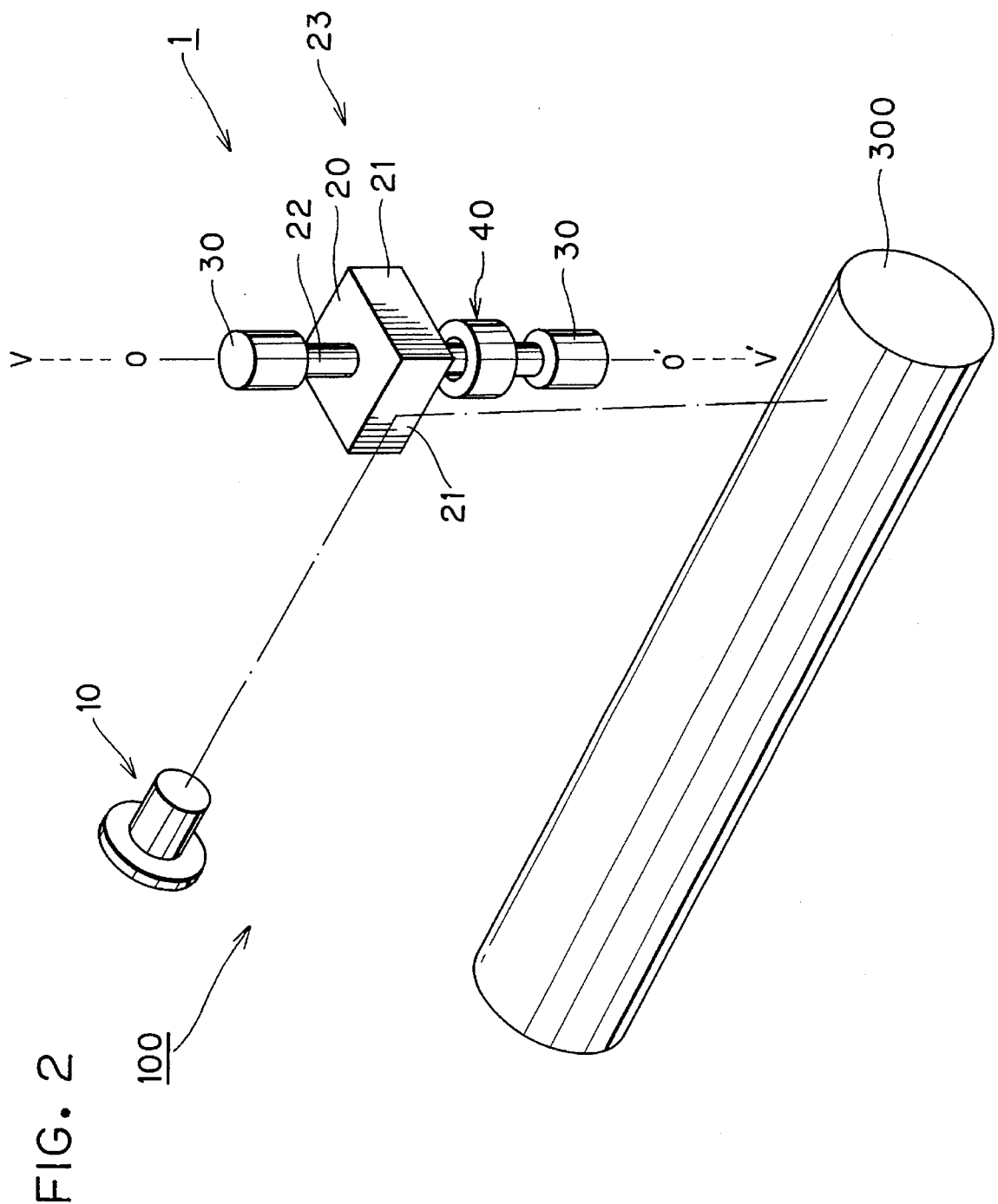
FIG. 2 is a perspective view schematically showing a structure of a light scanning device of an embodiment of the present invention.

As shown in FIG. 2, a light scanning device 1 of the present embodiment includes: a light source 10 for emitting a light beam modulated in accordance with image information; a rotational shaft 22 extending along a rotational or central axis O—O'; a polygonal mirror 20 with four mirror surfaces 21 fixedly and concentrically mounted on the rotational shaft 22 for reflecting the light beam outputted from the light source 10; a bearing device 30 for rotatively supporting the rotational shaft 22; and a motor 40 for its rotatingly driving the rotational shaft 22 about its axis O—O'. It is noted that the polygonal mirror 20 is mounted on the rotational shaft 22 with the central axis of the polygonal mirror extending along the central axis O—O'.

Thus constructed light scanning device 1 scans the light beam onto a photosensitive drum 300 so as to form thereon a latent image corresponding to the image information.

The light scanning device 1 and the photosensitive drum 300 are enclosed in a housing (not shown) of an electrophotographic image recording apparatus 100. In the housing of the apparatus 100 are further provided a well-known developing device (not shown) for developing the latent image formed on the photosensitive drum 300 and an also well-known transferring and fixing device (not shown) for transferring the developed image onto an output medium and for fixing the image thereto.

If the four mirror surfaces 21 are at varying angles with respect to the central axis of the polygonal mirror 20, an optical system such as a well-known cylindrical lens (not shown) should be provided to compensate for this variation in the orientations of the mirror surfaces 21.

The polygonal mirror 20 mounted on the rotational shaft 22 rotates or spins at a constant speed, i.e., a constant angular speed to scan light beam with a constant angular scanning speed. An f - θ lens system (not shown) is therefore provided at a position between the polygonal mirror 20 and the photosensitive medium 300 for receiving the light beam reflected from the polygonal mirror 20 and for outputting the light beam. The light beam outputted from the f - θ lens system scans the photosensitive medium 300 with a constant linear scanning speed.

The light scanning device 10 with the above structure can properly scan the light beam on the peripheral surface of the photosensitive drum 300.

The light source 10 is supplied with image signals which are fed into the electrophotographic image recording apparatus 100 from an external input device (not shown) such as a computer device. The light source 10 is controlled by the image signals to emit a light beam with its intensity modulated in accordance with the image signals.

Figure 3:
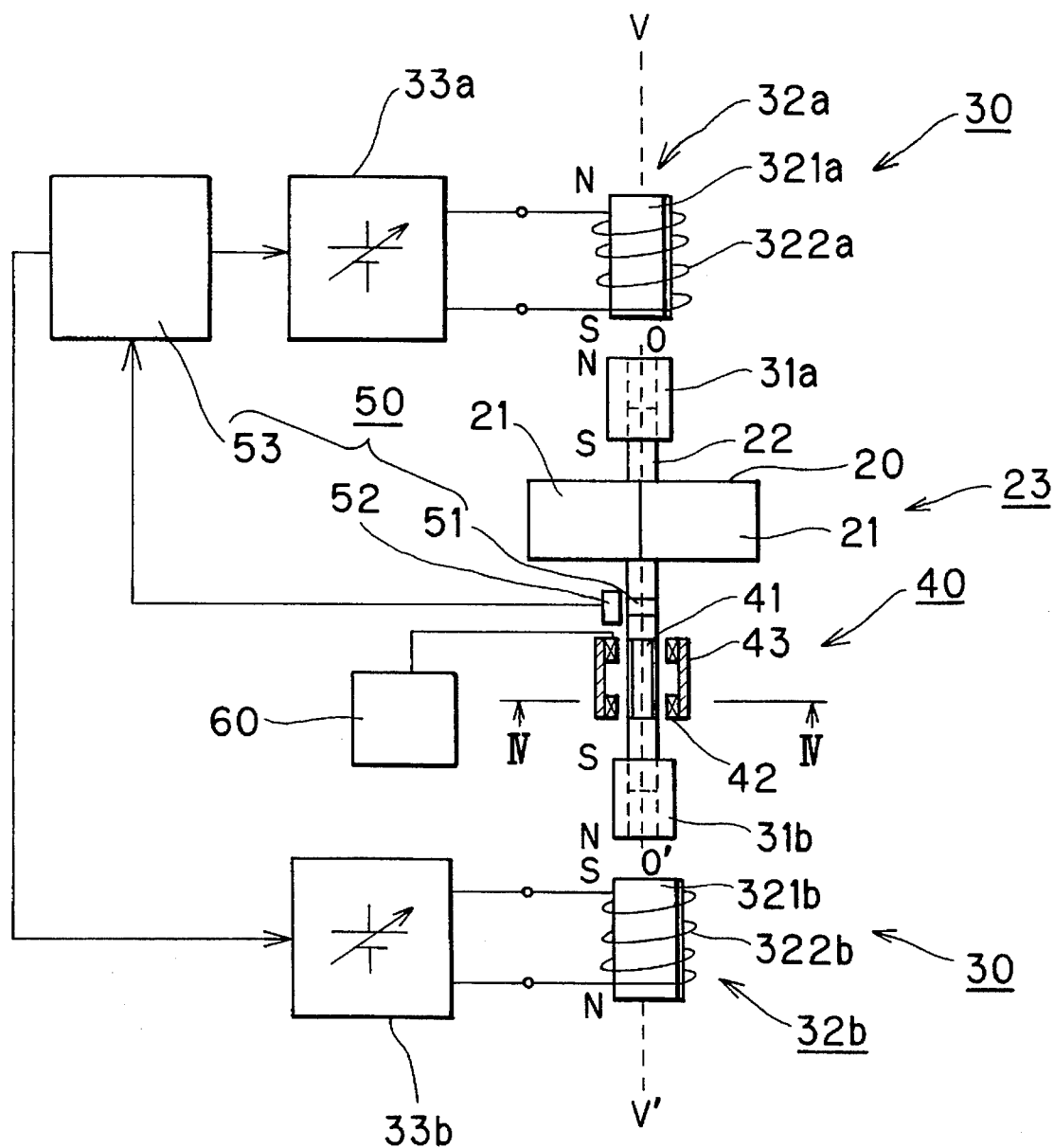
FIG. 3 partially sectionally shows the schematic structure of a rotational shaft 22, a reflective mirror 20, a motor 40, and a bearing device 30 of the embodiment, the bearing device supporting the rotational shaft with an adjustable bearing stiffness.
Figure 4:
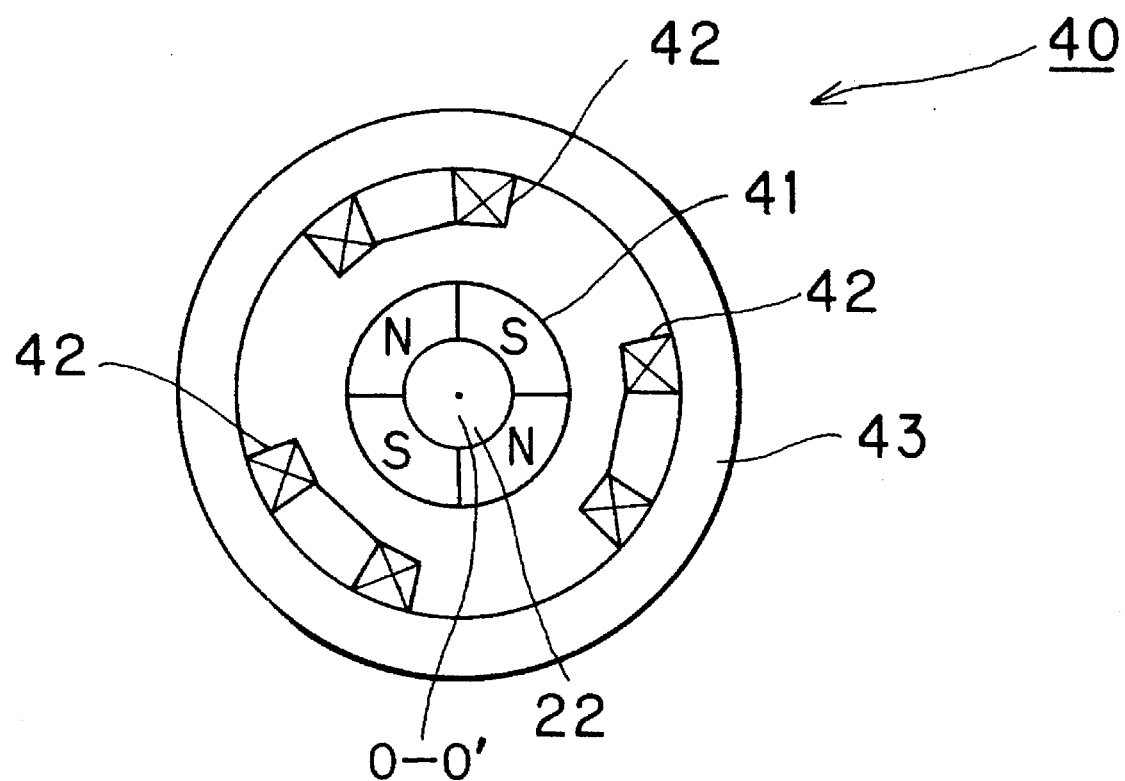
FIG. 4 shows a cross section of the motor 40 provided on the rotational shaft of the embodiment taken along a line IV—IV of FIG. 3.

As shown in FIGS. 3 and 4, the motor 40 is, for example, a stepper motor constructed from a combination of: a rotor formed from four magnetic poles 41 provided on the rotational shaft 22; and a stator made from a holder 43 provided with three coils 42. As shown in FIG. 4, the four magnetic poles 41 are buried in a part of the rotational shaft 22 at its outer peripheral surface around the central axis O—O'. The holder 43 is fixedly mounted in the housing (not shown) of the electrophotographic image recording apparatus 100. The holder 43 is of a hollow cylindrical shape through which the rotational shaft 22 penetrates. The three coils 42 are provided on the inner peripheral surface of the holder 43 to confront the four magnetic poles 41 with a predetermined gap formed therebetween. When the coils 42 are supplied with electric current, magnetic force is generated between the coils 42 and the magnetic poles 41 to rotate the rotational shaft 22 about its central axis O—O'. The motor 40 is electrically connected to a power supply 60. The power supply 60 supplies the coils 42 with electric current pulses (drive signals) with their frequency determining the rotating speed (angular speed) or rotating number of the rotational shaft 22.

The reflective mirror 20 is mounted on the rotational shaft 22 substantially at its middle portion along the central axis O—O'. The rotational shaft 22 has a pair of permanent magnets 31a and 31b, at its both ends along the central axis O—O'. The permanent magnets 31a and 31b are fixedly mounted on the rotational shaft 22, with their S poles being directed to confront the reflective mirror 20 which is mounted essentially on the middle portion of the rotational shaft 22. Each of the permanent magnets 31a and 31b is of a hollow cylindrical shape and is bonded or force-fitted to the corresponding tip end portions of the rotational shaft 22.

The bearing device 30 is provided for rotatively supporting the rotational shaft 22 so that the central axis O—O' may extend substantially vertically. Accordingly, the polygonal mirror 20 mounted on the rotational shaft 22 scans light beam substantially in a horizontal direction.

As shown in FIG. 3, the bearing device 30 includes: a pair of electromagnets 32a and 32b and a pair of voltage control circuits 33a and 33b. The electromagnet 32a is constructed from an iron core 321a and a coil 322a wound over the iron core 321a. Similarly, the electromagnet 32b is constructed from an iron core 321b and a coil 322b wound over the iron core 321b. The electromagnets 32a and 32b are fixedly mounted in the housing (not shown) of the apparatus 100. The electromagnets 32a and 32b are separated from each other along a vertical line V—V' which extends vertically in the housing. The rotational shaft 22 is located between the electromagnets 32a and 32b so that the central axis O—O' may extend along the vertical line V—V'. The permanent magnets 31a and 31b provided on the both ends of the rotational shaft 22 are located confronting the electromagnets 32a and 32b with predetermined gaps of the same value being formed therebetween.

The voltage control circuits 33a and 33b apply controlled electric voltages through the coils 322a and 322b, respectively, which cause electric currents of desired amount to flow through the coils 322a and 322b. Electric currents thus flowing through the coils 322a and 322b magnetize the iron cores 321a and 321b with their S poles directed to confront the N poles of the permanent magnets 31a and 31b. The voltage control circuits 33a and 33b adjust the electric voltages applied through the coils 322a and 322b to thereby control amounts of magnetization developed by the iron cores 321a and 321b.

The rotational shaft 22 is provided with a rotational number detecting unit 50 for detecting the rotational number, i.e., the rotational speed of the rotational shaft 22. The rotational number detecting unit 50 includes: a magnet 51 provided or buried in a part of the rotational shaft 22; and a detector 52 for detecting change in magnetic flux developed by the magnet 51 which is rotating together with the rotational shaft 22. Information on the rotational number of the rotational shaft 22 thus detected by the detector 52 is fed to a control signal generating circuit 53. The control signal generating circuit 53 produces control signals dependently on the supplied rotational speed information. The control signals are supplied to the voltage control circuits 33a and 33b so as to adjust the voltages applied through the coils 322a and 322b and therefore adjust the electric currents flowing through the coils 322a and 322b. It is noted that the control signal generating circuit 53 outputs, to the voltage control circuits 33a and 33b, the same control signals. Accordingly, the coils 322a and 322b are always supplied with the same amount of electric currents for exhibiting the same amount of magnetization.

The rotational shaft 22 and the reflective mirror 20 are combined into a rotational body 23 which is supported by the bearing device 30 to rotate about the rotational axis O—O'.

In the bearing device 30 with the above-described structure, magnetic attractive forces generated between the permanent magnet 31a and the electromagnet 32a and generated between the permanent magnet 31b and the electromagnet 32b construct a bearing force for floatingly supporting the rotational shaft 22, with the permanent magnets 31a and 31b (united with the rotational shaft 22) being held separated from the electromagnets 32a and 32b.

When the rotational body 23 constructed from the rotational shaft 22 and the polygonal mirror 20 spins or rotates about the central axis O—O', the central axis O—O' of the rotational shaft may whirl or vibrate about the vertical line V—V' in the two modes of natural resonances, that is, the cylindrical mode and the conical mode. The resonant frequencies $\Omega y$ and $\Omega o$ of the cylindrical and conical modes of the natural whirls are also expressed by the already-described equations (1) and (2). In the equations (1) and (2), the bearing stiffness S is determined dependently on the bearing device 30 which is described below, with reference to FIG. 5.

The rotational shaft 22 is generally located at an equilibrium position where the central axis O—O' coincides with or extends along the vertical line V—V'. In the equilibrium condition, the magnetic attractive forces generated between the permanent magnet 31a and the electromagnet 32a and generated between the permanent magnet 31b and the electromagnet 32b are balanced. Sometimes, however, external disturbances may cause the central axis O—O' of the rotational shaft 22 to be displaced from the equilibrium position, i.e., the vertical line V—V'. (It is noted that if the center of gravity of the rotational body 23 is slightly displaced from the central axis O—O', a centrifugal force may be generated to also cause the central axis O—O' to be displaced from the equilibrium position V—V'.) The displacement amount is now represented by X.

Figure 5:
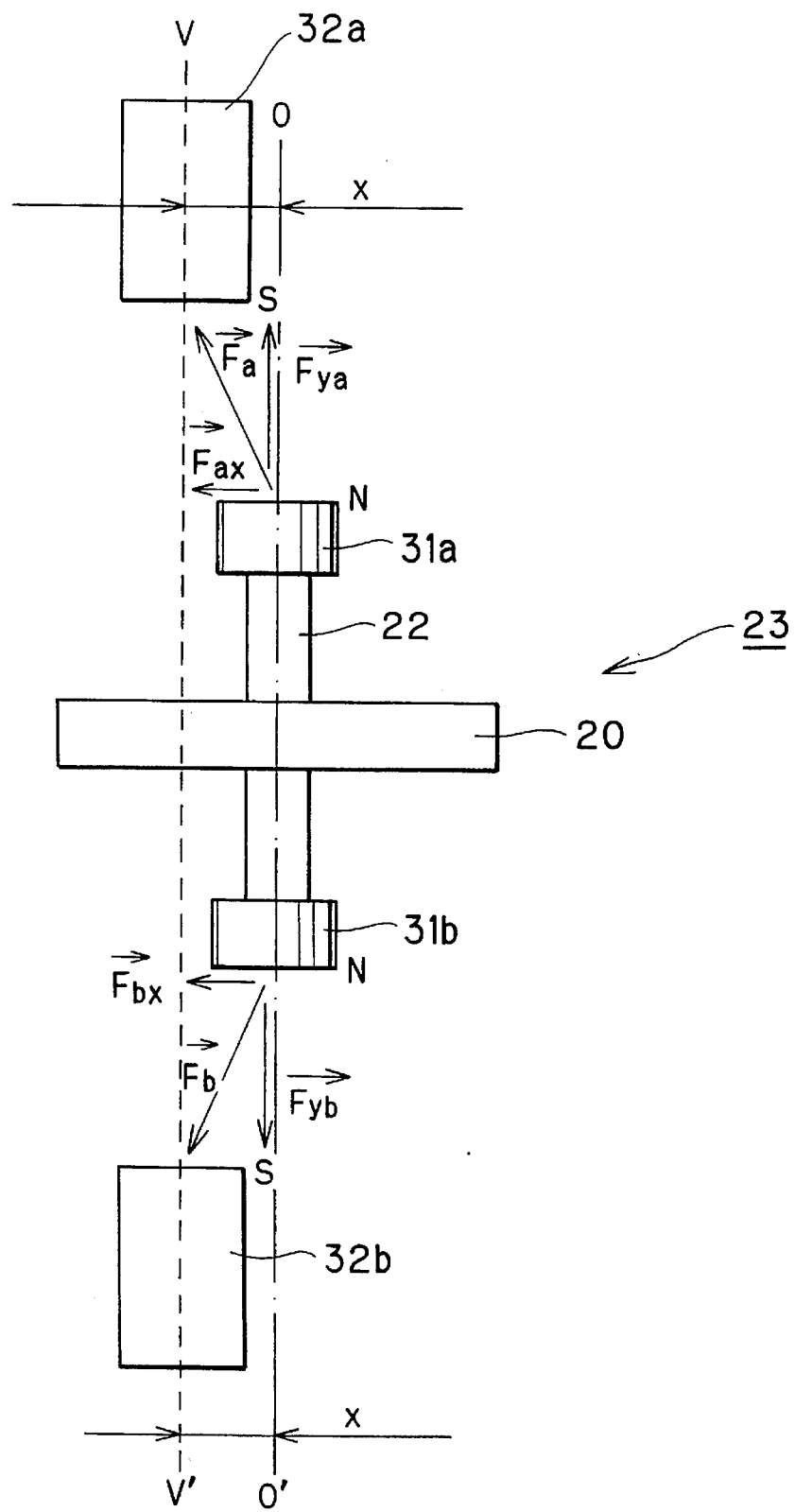
FIG. 5 illustrates the bearing stiffness which the bearing device 30 exhibits to the rotational body 23 constructed from the combination of the reflective mirror 20 and the rotational shaft 22.

When the central axis O—O' of the rotational shaft 22 is thus displaced from the equilibrium position, magnetic attractive forces Fa and Fb are generated as shown in FIG. 5 between the permanent magnet 31a and the electromagnet 32a and between the permanent magnet 31b and the electromagnet 32b, respectively. A vertical component Fya of the force Fa has the same amount with a vertical component Fyb of the force Fb. The direction of the component Fya is opposite to that of the component Fyb. Accordingly, the components Fya and Fyb are balanced. Contrarily, a horizontal component Fax of the force Fa is the same as a horizontal component Fbx of the force Fb, both in its amount and in its direction. The components Fax and Fbx therefore serve as bearing restoring forces for restoring the displaced rotational shaft toward its equilibrium position. Accordingly, the components Fax and Fbx can be equally represented by Fx.

The bearing stiffness S of the bearing device 30 can therefore be expressed by the ratio between the displacement amount X and the restoring force amount Fx. In other words, the bearing stiffness S of the bearing device 30 can be expressed by the following equation (4):

$$S = Fx/X \quad (4)$$

It is therefore apparent that varying the amounts of magnetization of the electromagnets 32a and 32b adjusts the magnetic attractive forces Fx and therefore adjust the bearing stiffness S of the bearing device 30. More specifically, increasing the voltages applied through the coils 322a and 322b increases the bearing stiffness S of the bearing device 30. Alternatively, lowering the voltages decreases the bearing stiffness S.

Figure 6:
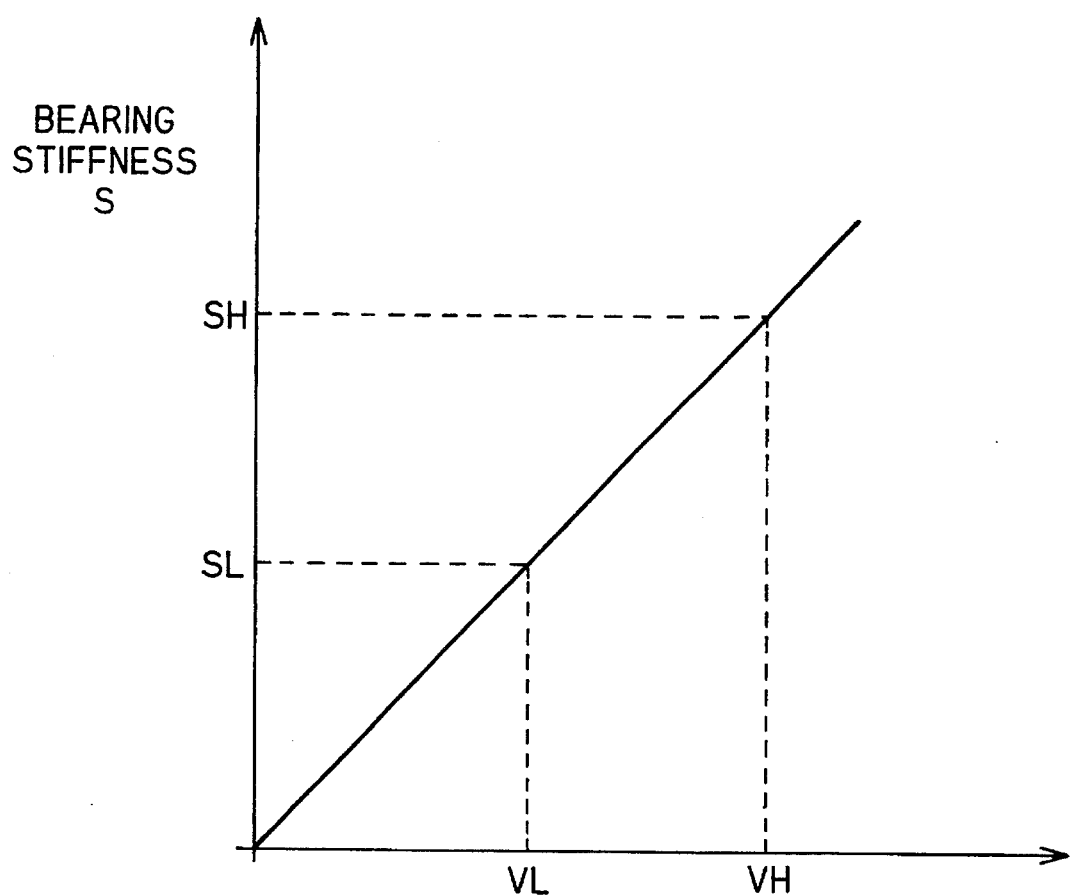
FIG. 6 is a graph showing the relationship between the electric voltage applied to coils 322a and 322b of the bearing device 30 and the bearing stiffness of the bearing device 30.

FIG. 6 shows the state how the bearing stiffness S of the bearing device 30 varies in accordance with the electric voltages applied through the coils 322a and 322b from the voltage control circuits 33a and 33b. It is apparent from FIG. 6 that the bearing stiffness S linearly changes with respect to the voltages applied through the coils. When one specific electric voltage VL determines the bearing stiffness to have a specific value SL, another specific electric voltage VH higher than the voltage VL determines the bearing stiffness to have another specific value SH higher than the value SL. It is therefore apparent that switching the electric voltages applied through the coils 322a and 322b between specific voltages VH and VL causes the bearing stiffness to be changed or switched between corresponding stiffness values SH and SL.

Figure 7:
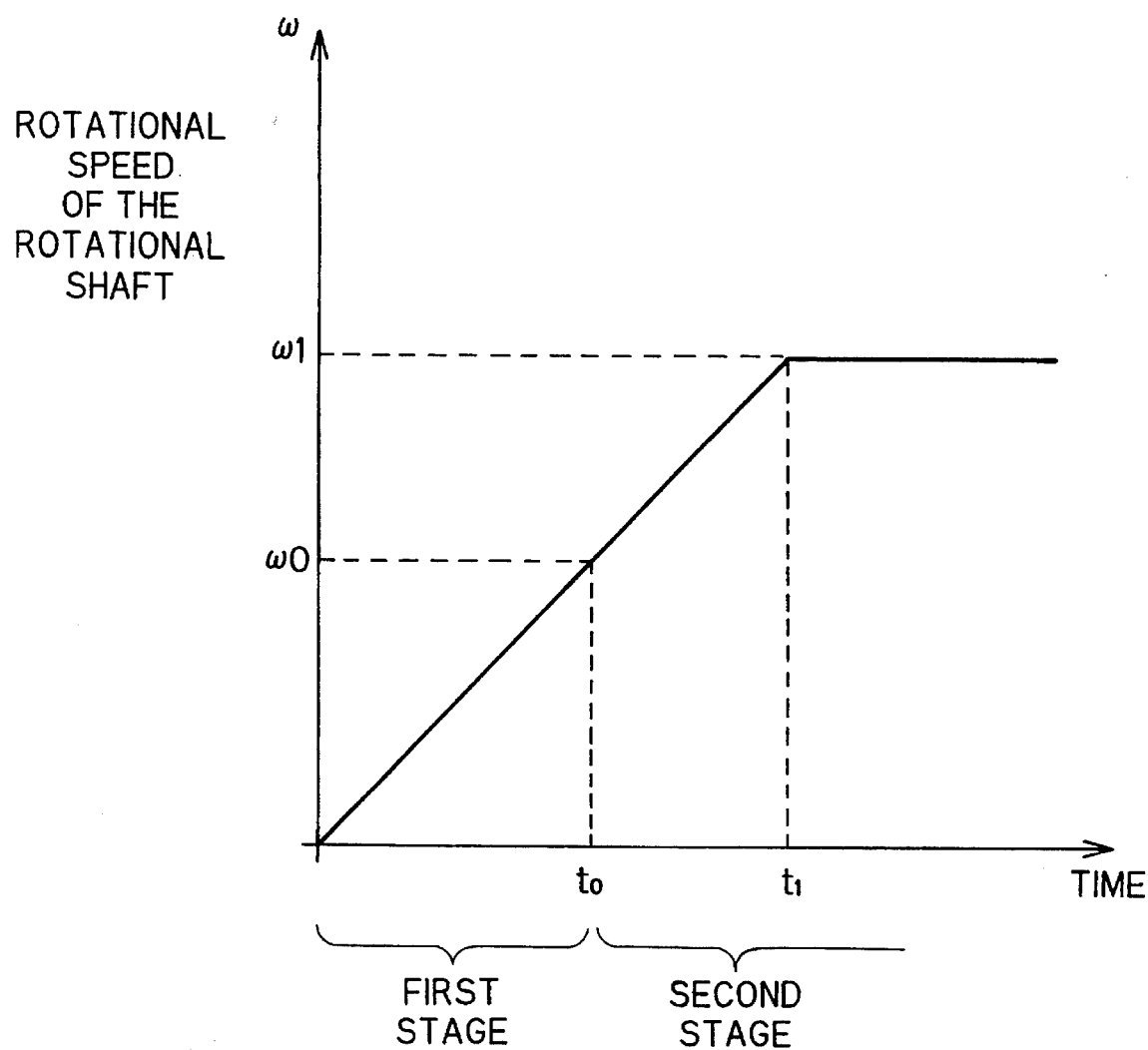
FIG. 7 is a graph showing the state how the rotational number of the rotational shaft 22 increases when the motor starts rotating it.

FIG. 7 shows the manner how the rotational shaft 22 starts rotating or runs up from rest. Generally, when the power supply 60 starts supplying the drive pulse signals (electric current pulses) to the coils 42 of the motor 40, the power supply 60 controls to linearly increase the frequency of the drive pulse signals with high rate. Accordingly, the rotational number or angular speed of the rotational shaft 22 linearly and quickly increases as shown in FIG. 7. When the frequency of the drive pulse signals reaches a predetermined value that rotates the rotational shaft 22 with the rotational speed of a desired value ω1, the power supply 60 fixes the frequency of the drive signals to the predetermined value. Accordingly, when the rotational number of the rotational reaches the value ω1 at the time t1, the rotational number stops increasing, but is fixed at the desired value ω1.

Figure 8:
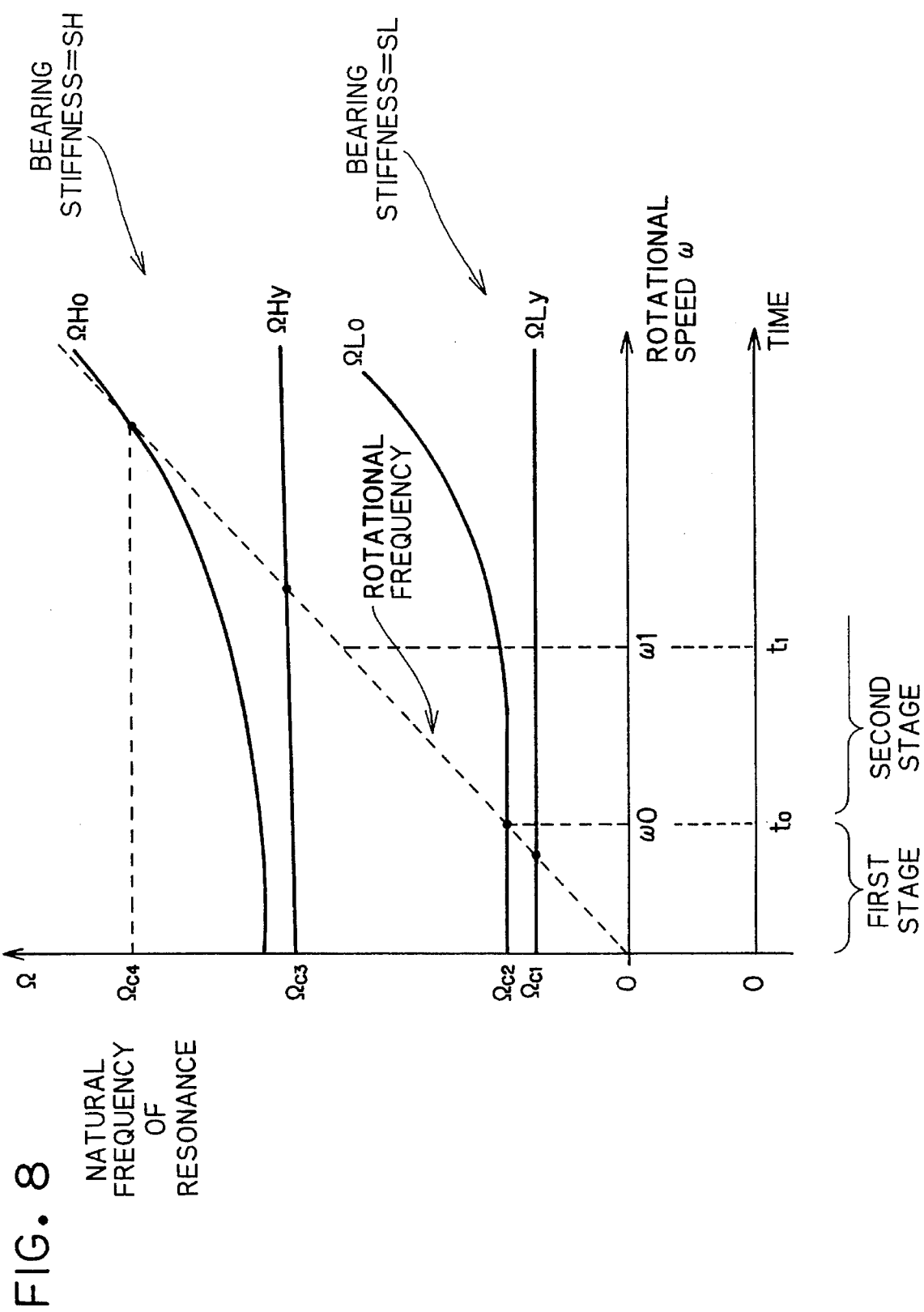
FIG. 8 illustrates the relationships between the rotational number of the reflective mirror and resonant frequencies of the resonant modes obtained for two levels of bearing stiffness SL and SH.

FIG. 8 shows the manner how the natural frequencies of the conical and cylindrical resonant modes expressed by the equations (1) and (2) change in accordance with the rotational number, i.e., the rotational speed of the rotational shaft 22. It is apparent from the equations that the resonant frequencies for both of the cylindrical and conical modes vary dependently on the bearing stiffness S of the bearing device 30. The equation (1) further shows that the resonant frequency for the cylindrical mode does not vary even when the rotation number of the rotational shaft 22 changes. The equation (2) shows that the resonant frequency for the conical mode increases as the rotational number (rotational speed) of the rotational shaft 22 increases.

In this figure, where the bearing device 30 has the high bearing stiffness SH of FIG. 6, the natural resonant frequencies $\Omega$Ho and $\Omega$Hy are obtained for the conical mode and the cylindrical mode, respectively. Where the bearing device 30 has the low bearing stiffness SL, the natural resonant frequencies $\Omega$Lo and $\Omega$Ly are obtained for the conical mode and the cylindrical mode, respectively.

As the rotational speed (rotational number) of the rotational shaft 22 increases, rotational frequency of the rotational shaft 22 which is equal to the rotational number follows the 45° line as indicated by dotted line in FIG. 8. The points of intersections of this dotted line with the four lines of the natural resonant frequencies $\Omega$Ho, $\Omega$Hy, $\Omega$Lo and $\Omega$Ly indicate critical conditions at which the rotational frequency of the rotational shaft 22 equals the frequencies of the four types of natural modes of vibrations. At these critical conditions, the rotational shaft 22 will excite the corresponding mode of natural resonance to be dangerously displaced from its equilibrium position with a very large amplitude.

More specifically, in the case where the bearing device 30 has the low bearing stiffness SL, when the rotational frequency of the rotational shaft 22 traverses the first and second critical frequencies $\Omega$c1 and $\Omega$c2, the rotational shaft excites the cylindrical mode of whirls and the conical mode of whirls, respectively. In the case where the bearing device 30 has the high bearing stiffness SH, when the rotational frequency traverses the third and fourth critical frequencies $\Omega$c3 and $\Omega$c4, the rotational shaft excites the cylindrical mode of whirls and the conical mode of whirls, respectively. It is noted that the critical frequencies $\Omega$c1 and $\Omega$c2 for the low bearing stiffness SL are much lower than the critical frequencies $\Omega$c3 and $\Omega$c4. The critical frequency $\Omega$c1 is lower than the critical frequency $\Omega$c2. The critical frequency $\Omega$c3 is lower than the critical frequency $\Omega$c4. Because the rotational speed linearly increases as shown in FIG. 7 in this embodiment, a time axis is also indicated in FIG. 8.

In the present embodiment, the rotational shaft 22 is desired to rotate at a predetermined high rotational speed or rotational frequency ω1. This rotational frequency ω1 should be much higher than the critical speed $\Omega$c2.

If the bearing stiffness S is fixed to the low stiffness SL, when the rotational speed increasing from zero value to the desired value ω1 traverses the two critical speeds $\Omega$c1 and $\Omega$c2, the rotational shaft 22 excites the corresponding modes of natural resonances. If the bearing stiffness S is fixed to the high stiffness SH, on the other hand, when the rotational shaft 22 is rotating at the full speed ω1, if the rotational speed or frequency ω1 is not so much lower than the critical frequencies $\Omega$c3 and $\Omega$c4, there is a possibility that the rotational shaft may be influenced by the corresponding resonances.

According to the present invention, therefore, the bearing stiffness is adjusted to be switched between the high stiffness SH and the low stiffness SL, as will be described below.

As shown in FIGS. 7 and 8, now assume that the rotational speed exceeds or becomes higher than a rotational speed ω0 that is equal to the second critical frequency $\Omega$c2, at the time t0. A first stage is defined between the initial time t=0 where the rotational shaft is at rest, i.e., the rotational speed has a zero value and the time t0 where the rotational speed exceeds the value ω0. A second stage is defined after the time t0.

Figure 9:
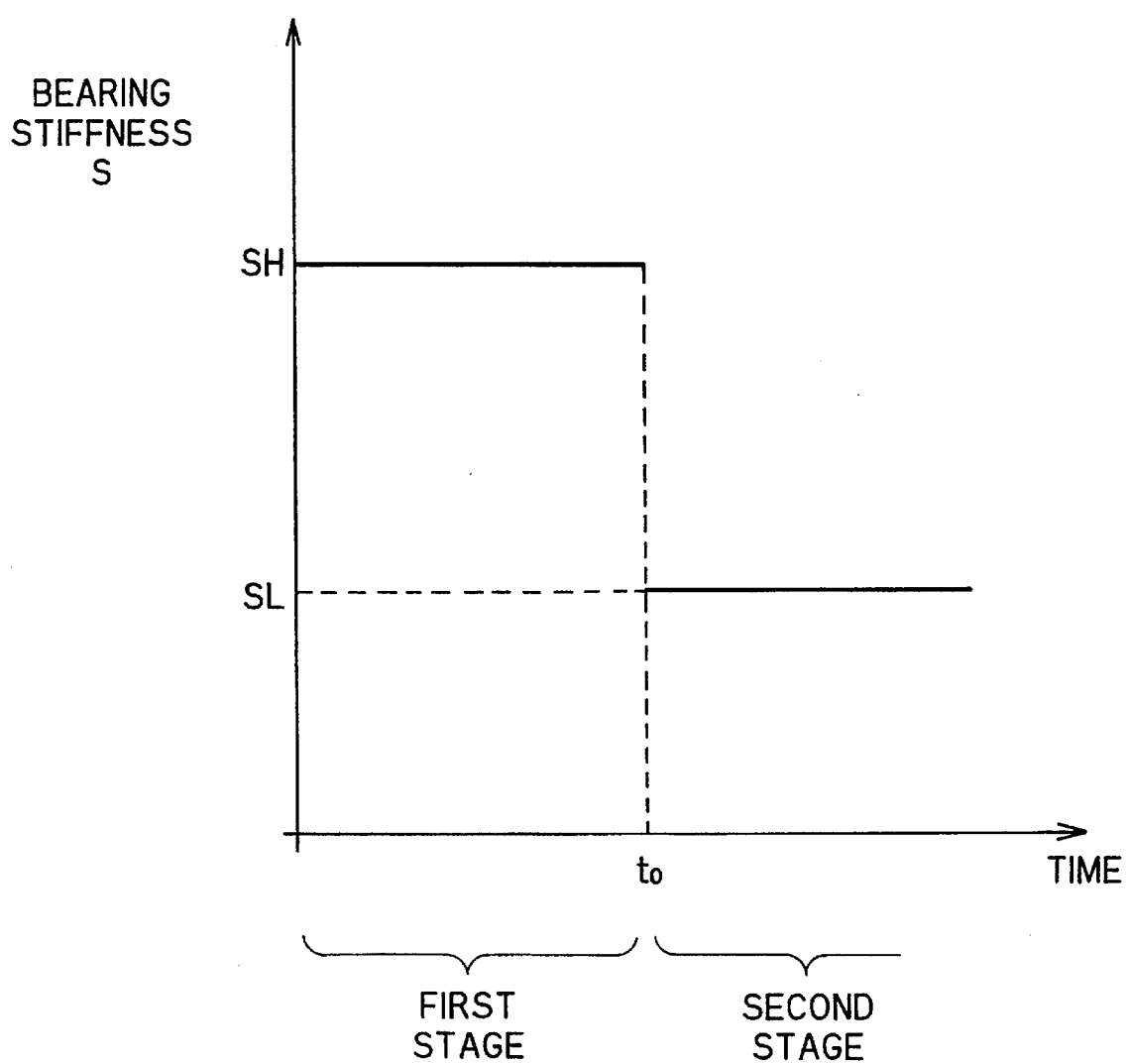
FIG. 9 shows a timing at which the bearing stiffness of the bearing device is switched from the high value SH to the low value SL.

As shown in FIG. 9, in the first stage, the bearing stiffness of the bearing device 30 is set to the high value SH. The high bearing stiffness SH causes the rotational shaft 22 to have the natural resonant frequencies $\Omega$Hy and $\Omega$Ho that are much higher than the actual rotational frequency of the rotational shaft that is now in the range of 0 to ω0. Accordingly, it becomes possible to prevent the rotational frequency of the rotational shaft 22 from traversing the resonant frequencies $\Omega$Hy and $\Omega$Ho in the first stage.

Figure 1C:
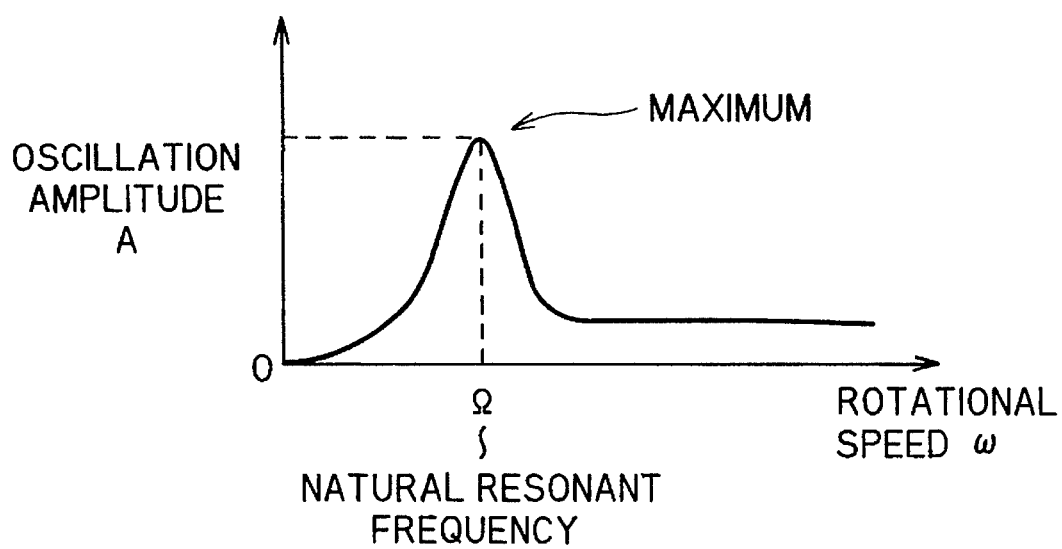
FIG. 1C is a graph showing the relationship between the rotational speed (rotational number) $\omega$ of the rotational body and the amplitude A at which the rotational body whirls or oscillates.

At the time t0 when the rotational speed exceeds or becomes higher than the rotational speed ω0, the bearing stiffness of the bearing device 30 is switched from the high value SH into the low value SL, which in turn causes the rotational shaft 22 to have the natural resonant frequencies $\Omega$Ly and $\Omega$Lo. Because the rotational speed or frequency of the rotational shaft 22 is being increased as shown in FIG. 7, the rotational frequency recedes from the rotational speed ω0, i.e., the critical frequency $\Omega$c2. As described already with reference to FIG. 1C, as the rotational frequency or rotational speed recedes from the critical frequency or natural resonant frequency, the amplitude at which the rotational shaft whirls or oscillates rapidly decreases. Accordingly, the rotational shaft 22 is prevented from oscillating at a large amplitude.

Then, as shown in FIG. 8, the rotational frequency quickly becomes much higher than the natural frequencies $\Omega$Ly and $\Omega$Lo. In the second stage after the time t0, the bearing stiffness is maintained at the low stiffness SL which causes the natural resonant frequencies of the rotational shaft 22 to be set to the values $\Omega$Ly and $\Omega$Lo. Because the rotational speed or rotational frequency of the rotational shaft 22 becomes much higher than the natural frequencies $\Omega$Ly and $\Omega$Lo as described above, it becomes possible to prevent the rotational frequency of the rotational shaft 22 from traversing the resonant frequencies $\Omega$Ly and $\Omega$Lo in this second stage.

Accordingly, thus switching the bearing stiffness prevents the rotational frequency of the rotational shaft 22 from coinciding with the resonant frequencies of any of the conical and cylindrical modes while the rotational number increases from zero value to the desired value ω1 and is fixed at the value ω1.

Operation of the bearing device 30 will be described in greater detail, below, with reference to FIGS. 3 through 9.

At the initial time t=0 where the rotational shaft 22 is at rest, the power supply 60 starts supplying the drive pulse signals (electric current pulses) to the coils 42 of the motor 40 so as to apply rotational driving force to the magnetic poles 41 of the motor 40. The rotational driving force starts rotating the rotational shaft 22. The power supply controls the frequency of the drive pulse signals to be linearly increased in accordance with time. As a result, the rotational number or rotational frequency of the rotational shaft 22 linearly increases in accordance with time as shown in FIG. 7.

Until the rotational number or rotational frequency detected by the detector 52 reaches the rotational frequency ω0, the control signal generating circuit 53 sets the electric voltage applied to each of the coils 322a and 322b to the higher value VH of FIG. 6 so as to set the bearing stiffness of the bearing device 30 to the higher value SH, as shown in FIG. 9. As shown in FIG. 8, the resonant frequencies ΩHo and ΩHy for the conical and cylindrical modes set with respect to the higher bearing stiffness SH are much higher than the actual rotational speed of the rotational shaft 22 that is now lower than ω0. Accordingly, during this first period of time, the rotational shaft 22 can be prevented from exhibiting resonant oscillation of any of the cylindrical and conical modes. It is therefore possible to prevent the rotational shaft 22 from being largely oscillated but to safely rotate the rotational shaft while increasing its rotational speed.

When the rotational number or rotational frequency detected by the detector 52 exceeds or becomes higher than the rotational frequency ω0 at the time t=t0, the control signal generating circuit 53 switches the electric voltage applied to each of the coils 322a and 322b from the higher value VH to the lower value VS of FIG. 6. Thus, the bearing stiffness of the bearing device 30 is switched from the higher value SH to the lower value SL, as shown in FIG. 9. As a result, the resonant frequencies of the conical and cylindrical modes are set to the values ΩLo and ΩLy.

The rotational number or rotational frequency of the rotational shaft 22 further increases from the value ω0 toward the desired value ω1. When the rotational number or rotational frequency reaches the desired value ω1, the rotational number is fixed at the value ω1 as shown in FIG. 7. The natural resonant frequencies ΩLo and ΩLy set during this second period of time (after the time t0) are much lower than the actual rotational frequency of the rotational shaft 22 that is in the range of ω0 to ω1. Accordingly, it is also possible to prevent the rotational shaft 22 from exhibiting any of the conical and cylindrical mode resonant actions during this period of time. Specifically, when the rotational shaft 22 rotates at the rotational speed ω1, because the resonant frequencies ΩLo and ΩLy are much lower than the rotational speed ω1, the rotational shaft 22 stably rotates at the rotation number ω1 without developing any resonant oscillation.

As described above, according to the present embodiment, switching the bearing stiffness of the bearing device 30 in accordance with the rotational number of the rotational shaft 20 can stably rotate the rotational shaft 22 without developing any resonant oscillation, both during the rotational number increases and during the rotational number is fixed at a high constant speed. Thus, it becomes possible to stably rotate the rotational shaft at a high constant speed.

Additionally, according to the present invention, the rotational body 23 is rotated with the full speed ω1 that is considerably higher than the natural resonant frequencies ΩLo and ΩLy which are set when the rotational body is rotated at the full speed ω1. At this condition, the rotational body 23 rotates smoothly about its center of gravity, with the inertial and centrifugal forces being balanced. The rotational body 23 therefore rotates with its radial deflection from its original position V—V' being the center-of-mass shift. Thus, the amplitude at which the rotational body 23 oscillates can be controlled or restrained to be equal to the amount by which the center of gravity of the rotational body 23 is displaced from the original position V—V'. Because the rotational body 23 can thus attain the self-balancing effect to rotate smoothly about its center of gravity, it is unnecessary to highly precisely position the center of the reflective mirror 20 with respect to the center of the rotational shaft 22, contrary to the conventional device. It is also unnecessary to mount the reflective mirror 20 on the rotational shaft 22 with highly precisely attaining a dynamic balance.

The electrophotographic image recording apparatus 100 employed with the light scanning device 1 operates as will be described below.

When the electrophotographic image recording apparatus 100 is supplied with command to record a desired image on an output medium, the power supply 60 starts supplying drive pulse signals to the coils 42 of the motor 40. The power supply linearly increases the frequency of the drive pulse signals, so that the rotational number or rotational frequency of the rotational shaft 22 linearly increases as shown in FIG. 7. The detector 52 repeatedly outputs signals indicative of the rotational number of the rotational shaft 22 to the control signal generating circuit 53. While receiving the signals indicative of the rotational number in the range of 0 to ω0, the control signal generating circuit 53 outputs a control signal instructing the voltage control circuits 33a and 33b to apply the predetermined high voltages VH to the coils 322a and 322b. Thus, the bearing device 30 exhibits the predetermined high bearing stiffness SH.

When receiving the signal indicative of the rotational number higher than the value ω0, the control signal generating circuit 53 switches to output another control signal instructing the voltage control circuits 33a and 33b to apply the predetermined low voltages VL to the coils 322a and 322b. As a result, the bearing stiffness of the bearing device 30 is switched from the predetermined high bearing stiffness SH to the low bearing stiffness SL, as shown in FIG. 9.

Then, the frequency of the drive pulse signals supplied from the power supply 60 reaches the value that enables the motor 40 to rotate the rotational shaft 22 with the desired rotational number ω1. At that time, the power supply stops increasing the frequency of the drive pulse signals, so that the rotational shaft 22 continues rotating with the rotational number ω1.

After that, the light source 10 is controlled by the image signals supplied thereto to intermittently emit a light beam in accordance with the image signals. The rotational shaft 22 is now rotating the reflective mirror 20 at the constant rotational number ω1 without any resonant oscillation being excited. The mirror surface 21 of the reflective mirror 20 receives the light beam outputted from the light source 10, and reflects it at high reflectivity. The rotational movement of the mirror surface 21 scans the light beam substantially along the horizontal direction so as to sequentially irradiate the light beam on the peripheral surface of the photosensitive drum 300. The peripheral surface of the photosensitive drum 300 which has been previously electrically charged with a charging device is formed with a latent image corresponding to the image signals.

The reflective mirror 20 mounted on the rotational shaft 22 now rotating stably without inducing any precession action directs light beam precisely at desired positions on the peripheral surface of the photosensitive drum 300. The latent image thus obtained to be precisely located on the photosensitive drum 300 is developed into a visible image through a well-known electrophotographic process. The visible image is then transferred to an output medium such as a sheet and is fixed thereon. The image receiving medium thus formed with the visible image is discharged out of the apparatus 100 as a hard copy object.

Figure 10:
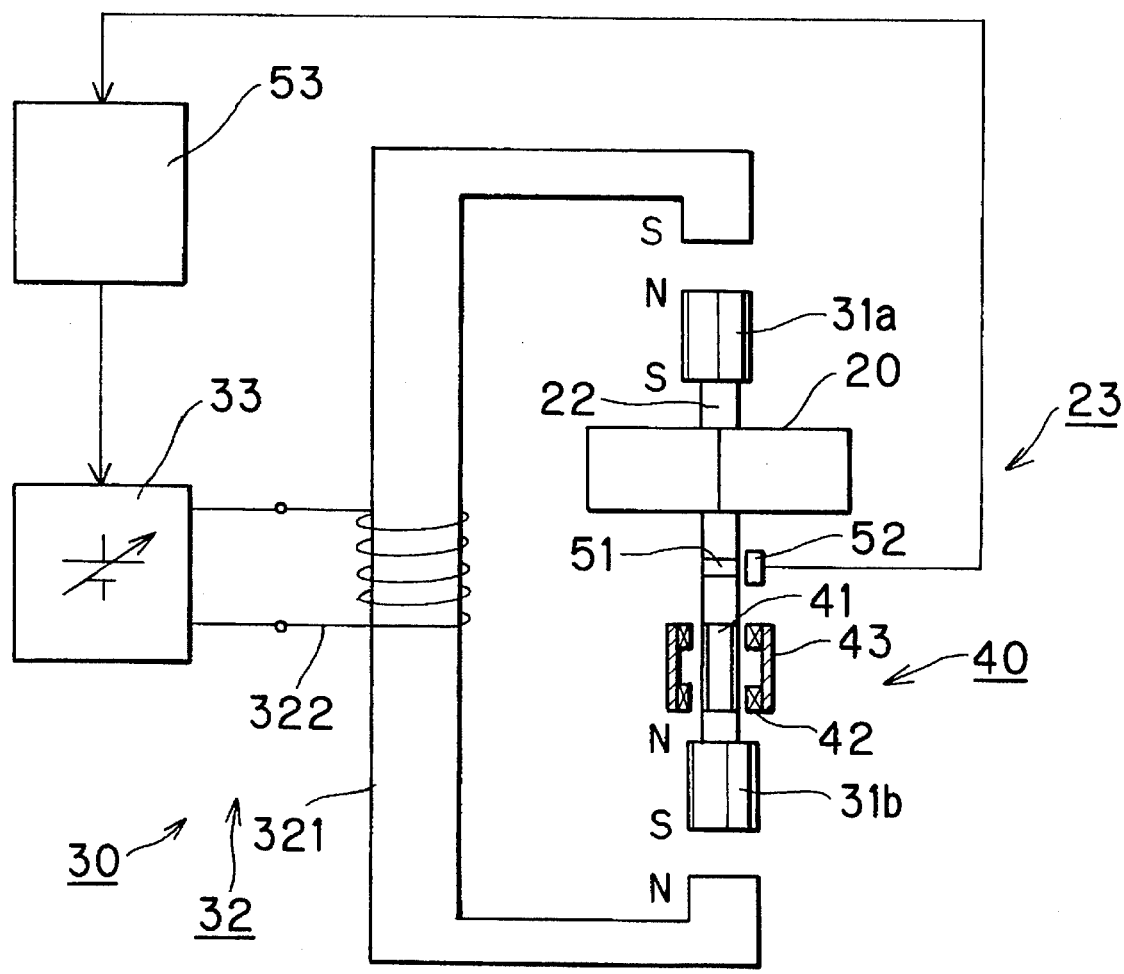
FIG. 10 shows a modification of the bearing device shown in FIG. 3.

The structure of the bearing device 30 is not limited to that described above in reference to FIG. 3. The structure may be modified as shown in FIG. 10. More specifically, the pair of electromagnets 32a and 32b may be replaced with a single electromagnet 32 constructed from a C-shaped iron core 321 and a coil 322 wound thereover. Because the C-shaped iron core 321 is magnetized as shown in FIG. 10, the permanent magnets 31a and 31b should be fitted to the rotational shaft 22 in such a manner that N-pole of the permanent magnet 31a and the S-pole of the permanent magnet 31b may be directed to confront the opposed ends of the C-shaped iron core 321. In this modification, the control signal generating circuit 53 controls a single voltage control circuit 33 to apply controlled electric voltage through the single coil 322. Thus controlling the electric voltage applied to the coil 322 can adjust the magnetic attractive forces generated between the permanent magnet 31a and the S-pole of the iron core 321 and generated between the permanent magnet 31b and the N-pole of the iron core 321. The bearing stiffness of the bearing device 30 is therefore adjustable similarly to that of FIG. 6.

While the invention has been described in detail with reference to a specific embodiment thereof, it would be apparent to those skilled in the art that various changes and modifications may be made therein without departing from the spirit of the invention.

For example, in the above-described embodiment, the bearing stiffness is switched from the higher value SH to the lower value SL, at the time t0 when the rotational number or rotational frequency of the rotational shaft 22 exceeds the value $\omega 0$ equal to the second critical frequency $\Omega c2$. However, the bearing stiffness switching timing is not limited to the timing when the rotational speed exceeds the second critical frequency $\Omega c2$. The bearing stiffness may be switched from the high value SH to the low value SL when the rotational speed reaches any value $\omega 0'$ that is higher than the second critical frequency $\Omega c2$ (a higher one of the two critical frequencies $\Omega c1$ and $\Omega c2$ for the low bearing stiffness SL) but lower than the third critical frequency $\Omega c3$ (a lower one of the two critical frequencies $\Omega c3$ and $\Omega c4$ for the high bearing stiffness SH.) It is noted that the value $\omega 0'$ should preferably be much lower than the third critical frequency $\Omega c3$ in order to prevent the rotational shaft from exciting the resonant oscillation with the resonant frequency $\Omega c3$ when the rotational speed approaches toward the value $\omega 0'$. More preferably, the value $\omega 0'$ should be equal to the second critical frequency $\Omega c2$ as in the above-described embodiment.

In the above embodiment, the rotational speed $\omega 1$, at which the rotational shaft 22 is desired to be rotated, is lower than the third and fourth critical frequencies $\Omega c3$ and $\Omega c4$ determined by the high bearing stiffness SH. However, the desired speed $\omega 1$ may be selected to have a value higher than the critical frequency $\Omega c3$ or $\Omega c4$. Also in this case, switching the bearing stiffness from the high stiffness SH to the low stiffness SL at the time when the rotational speed exceeds the value $\omega 0$ or reaches the above-described value $\omega 0'$ can prevent the rotational shaft 22 from exciting any resonant actions. It is noted that the speed $\omega 1$ should be much higher than the critical frequencies $\Omega c1$ and $\Omega c2$ which are obtained by the low bearing stiffness SL set during when the rotational shaft rotates at the speed $\omega 1$.

The structure of the bearing device 30 is not limited to those of FIGS. 3 and 10. Any structure is possible which can vary the bearing stiffness.

In the above-described embodiment, the reflective mirror 20 has four mirror surfaces 21 arranged about its central axis and therefore has a square-shaped cross section orthogonal to the central axis. However, the number of the mirror surfaces 21 may be freely selected. The reflective mirror 20 may therefore have a cross section of various shapes.

A reflective mirror 20 having a single mirror surface 21 can be employed. In this case, it is unnecessary to provide the optical system such as the cylindrical lens which is required for compensating for the varieties in the orientations of the plural mirror surfaces.

In the above-described embodiment, the motor 40 for rotating the rotational shaft is a stepper motor. However, any kinds of motors may be employed as the motor 40.

The structure of the stepper motor 40 is not limited to that shown in FIGS. 3 and 4, that is, the combination of the three coils and the four magnetic poles. Any structure is possible which may apply rotational driving force to the rotational shaft 22.

In the above-described embodiment, when the stepper motor 40 starts rotating the rotational shaft 22, the stepper motor linearly increases the rotational speed. However, the stepper motor 40 may increase the rotational speed exponentially or other various manners.

As described above, the light scanning apparatus of the present invention changes the bearing stiffness of the bearing device supporting the rotational shaft, in accordance with the rotational speed of the rotational shaft. During the rotational speed of the rotational shaft increases toward a desired value, the rotational speed (rotational frequency) does not traverse any resonant frequencies. Also during the rotational shaft constantly rotates at the desired rotational speed, the rotational speed (rotational frequency) is far different from any resonant frequencies. Accordingly, it is possible to stably rotate the rotational shaft at high speed.

What is claimed is:

1. A light scanning device for scanning light, comprising:

a reflective mirror having a mirror surface for receiving and reflecting light, the reflective mirror having a rotational shaft which extends along its central axis;

a bearing device for rotatively supporting the rotational shaft about its central axis with a bearing stiffness;

a driving member for rotating the rotational shaft about the central axis so as to rotate the reflective mirror about the central axis to thereby cause the reflective mirror to scan reflected light;

a control unit for controlling the bearing stiffness of the bearing device; and a detecting unit for detecting a rotational speed of the rotational shaft, wherein the control unit is connected to the detecting unit for adjusting the bearing stiffness of the bearing device in response to the detected rotational speed, the rotational shaft is provided with a pair of permanent magnets, at their opposite ends along the central axis, the bearing device includes a pair of electromagnets, each electromagnet being located to confront a corresponding one of the pair of permanent magnets, and the control unit adjusts a magnetization intensity of each of the pair of electromagnets to thereby control the bearing stiffness of the bearing device.

2. A light scanning device of claim 1, wherein the driving member starts rotating the rotational shaft to gradually increase the rotational speed of the rotational shaft, wherein the bearing device when having first predetermined bearing stiffness causes the reflective mirror to resonate with a first predetermined resonant frequency, and the bearing device when having second predetermined bearing stiffness different from the first predetermined bearing stiffness causes the reflective mirror to resonate with a second predetermined resonant frequency much lower than the first predetermined resonant frequency, and wherein the control unit switches the bearing stiffness from the first predetermined bearing stiffness to the second predetermined bearing stiffness when the rotational speed reaches a predetermined value which is higher than the second predetermined resonant frequency and lower than the first predetermined resonant frequency.

3. A light scanning device of claim 2, wherein the control unit switches the bearing stiffness from the first predetermined bearing stiffness to the second predetermined bearing stiffness when the rotational speed reaches a predetermined value which is higher than the second predetermined resonant frequency and lower than the first predetermined resonant frequency.

4. A light scanning device of claim 3, wherein the control unit switches the bearing stiffness from the first predetermined bearing stiffness to the second predetermined bearing stiffness when the rotational speed exceeds the second predetermined resonant frequency.

5. A light scanning device of claim 2, wherein the bearing device when having first predetermined bearing stiffness causes the reflective mirror to resonate in conical and cylindrical modes with predetermined first conical and cylindrical resonant frequencies, respectively, the first cylindrical resonant frequency being lower than the first conical resonant frequency, and the bearing device when having second predetermined bearing stiffness lower than the first predetermined bearing stiffness causes the reflective mirror to resonate in conical and cylindrical modes with second predetermined conical and cylindrical resonant frequencies which are much lower than the first predetermined conical and cylindrical resonant frequencies, the second conical resonant frequency being higher than the second cylindrical resonant frequency, and wherein the control unit switches the bearing stiffness from the first predetermined bearing stiffness to the second predetermined bearing stiffness when the rotational speed reaches a predetermined value which is higher than the second predetermined conical resonant frequency and lower than the first predetermined cylindrical resonant frequency.

6. A light scanning device of claim 5, wherein the control unit switches the bearing stiffness from the first predetermined bearing stiffness to the second predetermined bearing stiffness when the rotational speed reaches a predetermined value which is higher than the second predetermined conical resonant frequency and lower than the first predetermined cylindrical resonant frequency.

7. A light scanning device of claim 5, wherein the control unit switches the bearing stiffness from the first predetermined bearing stiffness to the second predetermined bearing stiffness when the rotational speed exceeds the second conical predetermined resonant frequency.

8. A light scanning device of claim 2, wherein the driving member includes a stepper motor and a motor control unit for causing the stepper motor to start rotating the rotational shaft to linearly increase the rotational speed of the rotational shaft.

9. A light scanning device of claim 1, wherein each of the pair of electromagnets includes a core and a coil provided over the core, and wherein the control unit includes a voltage adjusting unit for adjusting a voltage applied through the coil.

10. A light scanning device of claim 1, further comprising a light source for receiving image signals and for emitting a light beam with its intensity modulated in accordance with the image signals, the mirror surface of the reflective mirror receives and reflects the light beam to thereby scan the light beam.

11. A light scanning device of claim 10, further comprising a photosensitive medium for receiving the light beam scanned by the reflective mirror and for forming a latent image corresponding to the image signals.

12. A light scanning device for scanning light, comprising:

a reflective mirror having a mirror surface for receiving and reflecting light, the reflective mirror having a rotational shaft which extends along its central axis;

a bearing device for rotatively supporting the rotational shaft about its central axis with a bearing stiffness;

a driving member for rotating the rotational shaft about the central axis so as to rotate the reflective mirror about the central axis to thereby cause the reflective mirror to scan reflected light;

a control unit for controlling the bearing stiffness of the bearing device; and a detecting unit for detecting a rotational speed of the rotational shaft, wherein the control unit is connected to the detecting unit for adjusting the bearing stiffness of the bearing device in response to the detected rotational speed, the rotational shaft is provided with a pair of permanent magnets, at their opposite ends along the central axis, the bearing device includes a single electromagnet having opposite ends, each end being located to confront a corresponding one of the pair of permanent magnets, and the control unit adjusts a magnetization intensity of the electromagnet to thereby control the bearing stiffness of the bearing device.

13. A light scanning device of claim 12, wherein the electromagnet includes:

a core having opposite ends, each of which is located confronting a corresponding one of the pair of permanent magnets; and a coil provided over the core, and wherein the control unit includes a voltage adjusting unit for adjusting a voltage applied through the coil.

14. A light scanning device of claim 12, wherein the driving member starts rotating the rotational shaft to gradually increase the rotational speed of the rotational shaft, wherein the bearing device when having first predetermined bearing stiffness causes the reflective mirror to resonate with a first predetermined resonant frequency, and the bearing device when having second predetermined bearing stiffness different from the first predetermined bearing stiffness causes the reflective mirror to resonate with a second predetermined resonant frequency much lower than the first predetermined resonant frequency, and wherein the control unit switches the bearing stiffness from the first predetermined bearing stiffness to the second predetermined bearing stiffness when the rotational speed reaches a predetermined value which is higher than the second predetermined resonant frequency and lower than the first predetermined resonant frequency.

15. A light scanning device of claim 14, wherein the control unit switches the bearing stiffness from the first predetermined bearing stiffness to the second predetermined bearing stiffness when the rotational speed reaches a predetermined value which is higher than the second predetermined resonant frequency and lower than the first predetermined resonant frequency.

16. A light scanning device of claim 15, wherein the control unit switches the bearing stiffness from the first predetermined bearing stiffness to the second predetermined bearing stiffness when the rotational speed exceeds the second predetermined resonant frequency.

17. A light scanning device of claim 14, wherein the bearing device when having first predetermined bearing stiffness causes the reflective mirror to resonate in conical and cylindrical modes with predetermined first conical and cylindrical resonant frequencies, respectively, the first cylindrical resonant frequency being lower than the first conical resonant frequency, and the bearing device when having second predetermined bearing stiffness lower than the first predetermined bearing stiffness causes the reflective mirror to resonate in conical and cylindrical modes with second predetermined conical and cylindrical resonant frequencies which are much lower than the first predetermined conical and cylindrical resonant frequencies, the second conical resonant frequency being higher than the second cylindrical resonant frequency, and wherein the control unit switches the bearing stiffness from the first predetermined bearing stiffness to the second predetermined bearing stiffness when the rotational speed reaches a predetermined value which is higher than the second predetermined conical resonant frequency and lower than the first predetermined cylindrical resonant frequency.

18. A light scanning device of claim 17, wherein the control unit switches the bearing stiffness from the first predetermined bearing stiffness to the second predetermined bearing stiffness when the rotational speed reaches a predetermined value which is higher than the second predetermined conical resonant frequency and lower than the first predetermined cylindrical resonant frequency.

19. A light scanning device of claim 17, wherein the control unit switches the bearing stiffness from the first predetermined bearing stiffness to the second predetermined bearing stiffness when the rotational speed exceeds the second conical predetermined resonant frequency.

20. A light scanning device of claim 14, wherein the driving member includes a stepper motor and a motor control unit for causing the stepper motor to start rotating the rotational shaft to linearly increase the rotational speed of the rotational shaft.

21. A light scanning device of claim 12, further comprising a light source for receiving image signals and for emitting a light beam with its intensity modulated in accordance with the image signals, the mirror surface of the reflective mirror receives and reflects the light beam to thereby scan the light beam.

22. A light scanning device of claim 21, further comprising a photosensitive medium for receiving the light beam scanned by the reflective mirror and for forming a latent image corresponding to the image signals.

\* \* \* \* \*